(12) United States Patent
Lin

(10) Patent No.: US 6,789,669 B1
(45) Date of Patent: *Sep. 14, 2004

(54) SMALL INLINE SPINNER BOX

(76) Inventor: Po-Hui Lin, No. 9, Lane 96, Sec. 2, Ho-Ping East Road, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/455,340

(22) Filed: Jun. 6, 2003

(51) Int. Cl.⁷ .............................................. B65D 85/00
(52) U.S. Cl. .................. 206/315.11; 206/523; 206/593; 220/528
(58) Field of Search ........................... 206/315.11, 523, 206/595; 220/528, 529, 552, 507

(56) References Cited

U.S. PATENT DOCUMENTS

| | | | | |
|---|---|---|---|---|
| 2,065,234 A | * | 12/1936 | Martinez ................... | 43/57.1 |
| 2,099,003 A | * | 11/1937 | De Witt et al. .............. | 43/57.1 |
| 4,631,856 A | * | 12/1986 | Born .......................... | 43/57.1 |
| 4,733,806 A | * | 3/1988 | Sloop ...................... | 206/316.2 |
| 4,989,747 A | * | 2/1991 | Demurger ................... | 220/324 |
| 5,271,499 A | * | 12/1993 | Van Horssen ............... | 206/335 |
| 5,505,328 A | * | 4/1996 | Stribiak ..................... | 220/4.22 |
| 5,555,671 A | * | 9/1996 | Voight et al. ................ | 43/57.1 |
| 5,829,185 A | * | 11/1998 | Myers ........................ | 43/57.1 |
| 6,241,090 B1 | * | 6/2001 | Kaplinsky .............. | 206/315.11 |
| 6,427,834 B1 | * | 8/2002 | Lin ............................. | 220/328 |

* cited by examiner

Primary Examiner—Joseph Man-Fu Moy
(74) Attorney, Agent, or Firm—Rosenberg, Klein & Lee

(57) ABSTRACT

A small inline spinner box comprised of an enclosure, anchoring spacers, and a top lid that provides a case for containing fishing spinners which enables their organized placement to further facilitate access and handling.

1 Claim, 4 Drawing Sheets

SMALL INLINE SPINNER BOX

BACKGROUND OF THE INVENTION

1) Field of the Invention

The invention herein relates to fishing equipment and accessories, specifically a small inline spinner box that provides a case for the storage of fishing spinners which enables their organized placement as well as further facilitates access and handling.

2) Description of the Prior Art

Conventional fishing tackle boxes are utilized for the storage of line, hooks, floats, lead sinkers, lures, and other angling accessories; referring to FIG. 1, the said box 1 is typically comprised of a container 11 and a cover 12, the said container 11 divided into compartments 13 that are rectangular, square, or lengthy channels, and so on. The holding of all the said angling accessories by the conventional product can be problematic, especially for fishing spinners. Currently marketed fishing spinners are generally crafted in the shape of minnows with a hook attached at the abdomen or tail, but lures are also available in a range of shapes large and small such that if a quantity were placed into the compartments 13, users may suffer a puncture wound to the fingers while groping for a spinner or damage clothing due to snagging by a hook. Furthermore, the situating of a plurality of spinners in such a limited area at the same time also results in the wear and breakage of the hooks at the abdominal and posterior aspects of such fishing lures. However, to enhance the practicality and convenience of utilizing the said fishing tackle box, the applicant of the invention herein conducted extensive research and development based on many years of professional production experience to optimize the invention herein for even greater utility which, following repeated testing and improvement, culminated in the successful development of the small inline spinner box of the present invention.

SUMMARY OF THE INVENTION

The objective of the invention herein is to provide a small inline spinner box utilized for the organized placement of fishing spinners as well as further facilitating their access and handling.

To enable the examination committee a further understanding of the advantages and unique features of the structure of the present invention, the brief description of the drawings below are followed by the detailed description of the invention herein.

DETAILED DESCRIPTION OF THE INVENTION

Figure 1:
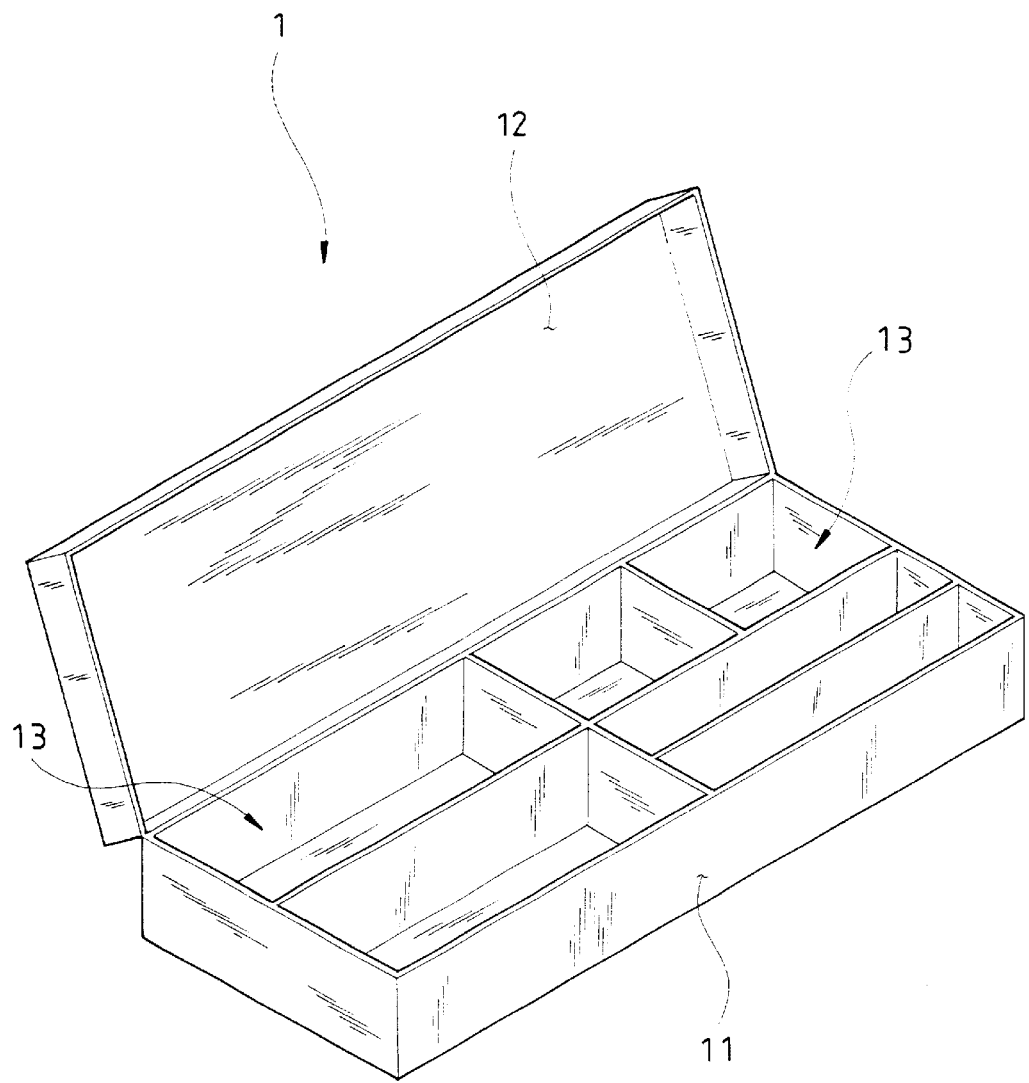
FIG. 1 is an isometric drawing of a conventional product.
Figure 2:
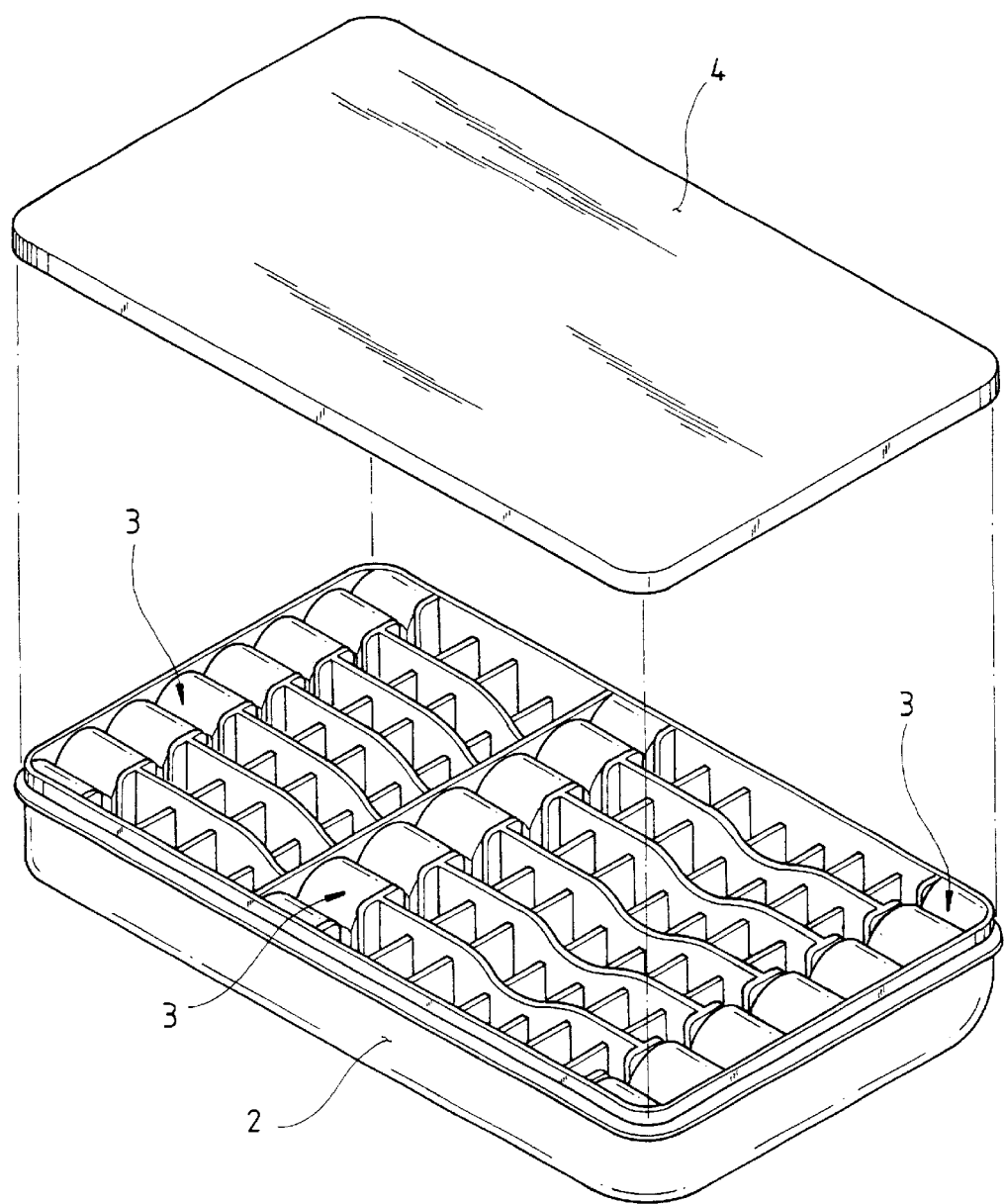
FIG. 2 is an isometric drawing of the invention herein.
Figure 3:
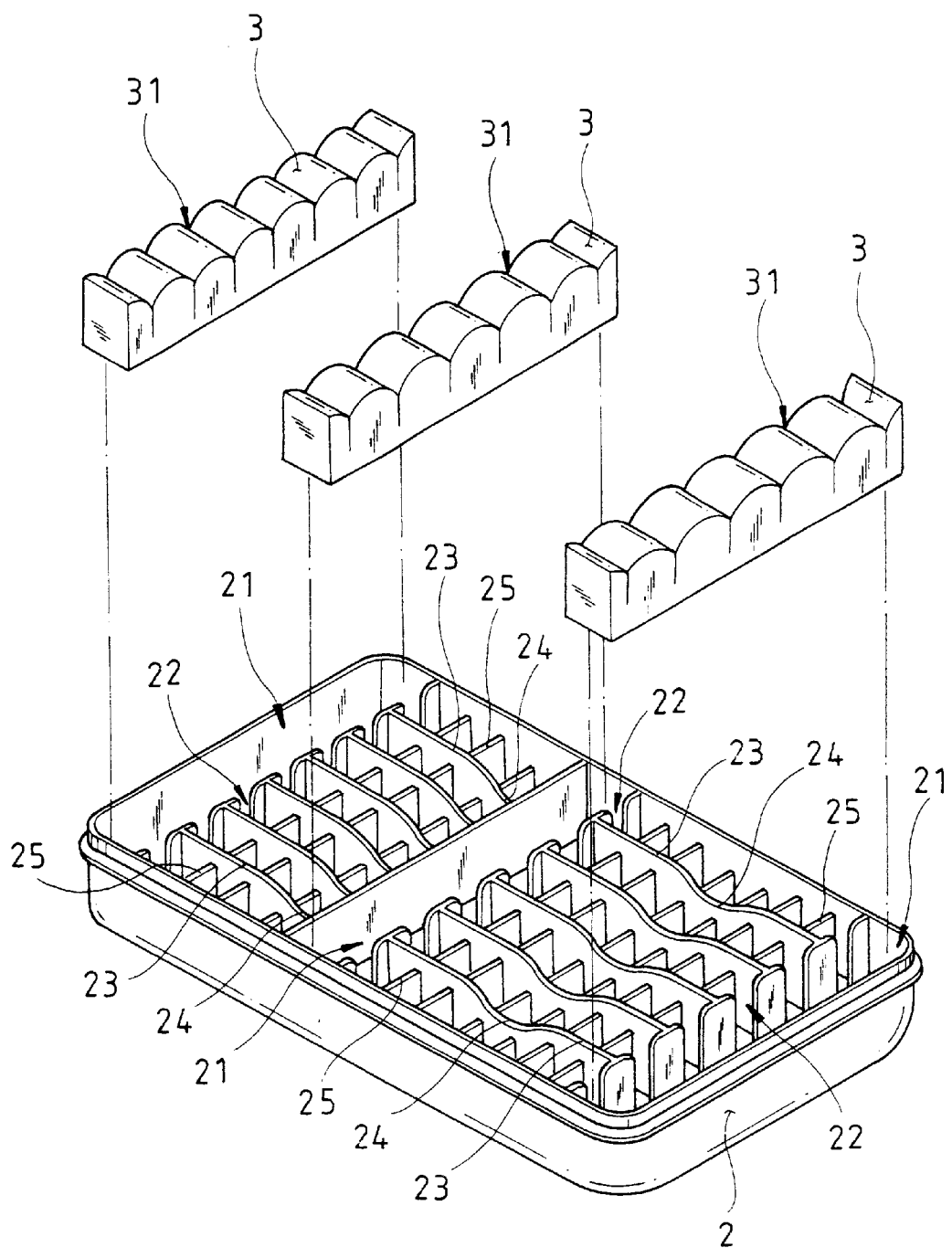
FIG. 3 is exploded drawing of the invention herein.

Referring to FIG. 2 and FIG. 3, the small inline spinner box of the invention herein is comprised of an enclosure 2, anchoring spacers 3, and a top lid 4, wherein:

The enclosure 2 is a flat rectangular box of one-piece plastic injection-molded construction; the said enclosure 2 has a channel 21 disposed inwards at its two ends and center, and a plurality of locating notches 22 are formed in one side of the channel 21; additionally, a plurality of partitioning plates 23 are perpendicularly arrayed in the said enclosure 2 between the channels 21 and, furthermore, a curved section 24 is downwardly contoured along one side or the center of the partitioning plates 23 and a plurality of ribs 25 project between the said plurality of partitioning plates 23, with the height of the said ribs 25 slightly lower than that of the partitioning plates 23.

Each anchoring spacer 3 is by design an elongate bar having wave-shaped contours across the top extent; a pinch slot 31 is formed along the center of the trough connecting every two wave-shaped peaks and, furthermore, each said pinch slot 31 is aligned with a locating notch 22 of the said enclosure 2; and each said anchoring spacer 3 is seated in a channel 21 of the enclosure 2.

The top lid 4 is rectangular in shape and fitted onto the upper edge of the enclosure 2 to complete the assembly of the small inline spinner box of the invention herein.

Figure 4:
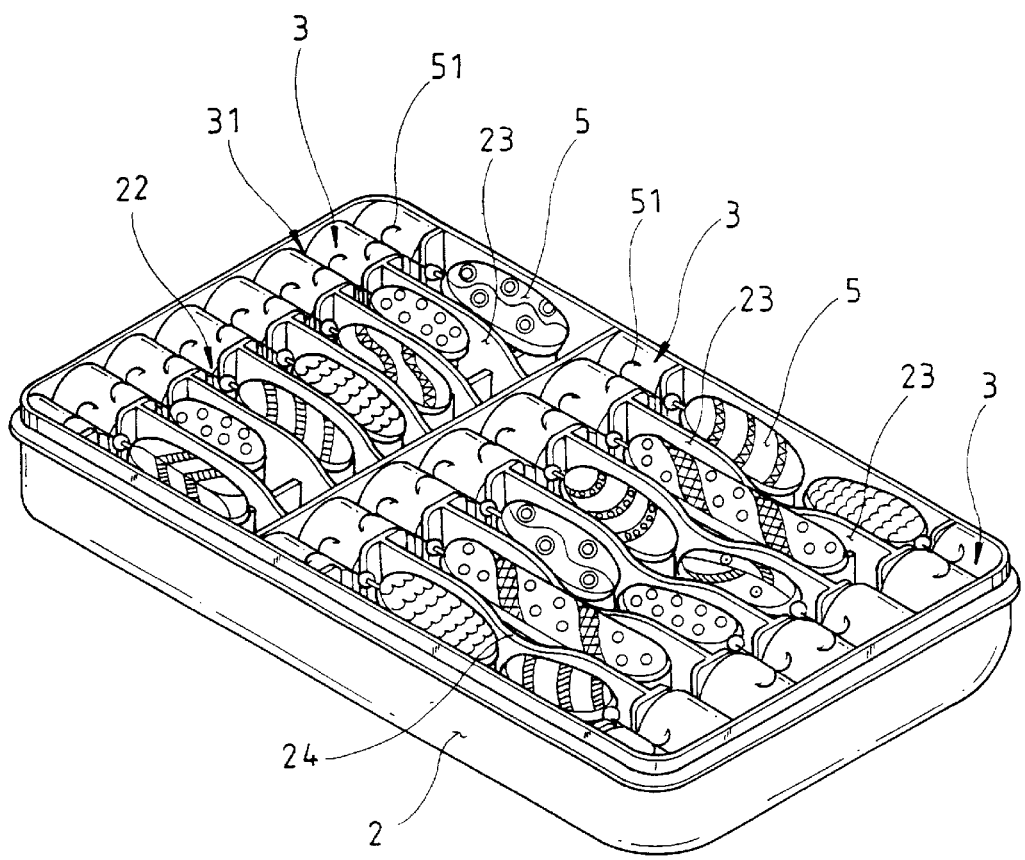
FIG. 4 is an isometric drawing of an embodiment of the invention herein.

Referring to FIG. 4, the enclosure 2 of the invention herein has a plurality of partitioning plates 23 and spinners 5 are placed in the spaces between the partitioning plates 23, with the hooks 51 at one extremity of each said spinner 5 postured through the locating notches 22 of the enclosure 2 and then secured in the pinch slots 31 of the anchoring spacer 3. As shown in the drawing, the present invention provides for the neatly organized placement of the hooks 51 connected to the spinners 5 and, furthermore, the said arrangement of the partitioning plates 23 and the ribs 25 built into the enclosure 2 is capable of greater organizational order and, furthermore, stability; moreover, the curved section 24 downwardly contoured along one side or center of the partitioning plates 23 is designed to further facilitate spinner 5 access and handling by users.

While the said arrangement of the present invention is certainly capable of achieving the claimed objectives and functions, the description of the most preferred embodiments of the invention herein is intended solely for the purpose of disclosing the features of the small inline spinner box invention herein and shall not be construed as a limitation of the spirit and scope of the present invention and, furthermore, all modifications and adaptive substitutions such as varying the quantity of channels and overall dimensions shall remain protected by the claims of the invention herein.

In summation of the foregoing section, since the small inline spinner box invention herein is an original invention within its product category that is capable of greater utility and practical value and, furthermore, an identical or similar product has never been observed on the market, the invention herein is submitted to the examination committee for review and the granting of the commensurate patent rights.

What is claimed is:

1. A small inline spinner box of the invention herein comprised of an enclosure, anchoring spacers, and a top lid, wherein:

the said enclosure is a flat rectangular box of one-piece plastic injection-molded construction; the said enclosure has a channel disposed inwards at its two ends and center, and a plurality of locating notches are formed in one side of the said channel; additionally, a plurality of partitioning plates are perpendicularly arrayed in the said enclosure between the said channels and, furthermore, a curved section is downwardly contoured along one side or center of the said partitioning plates and a plurality of ribs project between the said plurality of partitioning plates, with the height of the said ribs slightly lower than that of the said partitioning plates;

each said anchoring spacer is by design an elongate bar having wave-shaped contours across the top extent; a pinch slot is formed along the center of the trough connecting every two wave-shaped peaks and, furthermore, each said pinch slot is aligned with a said locating notch of the said enclosure; and each said anchoring spacer is seated in a said channel of the said enclosure;

the said top lid is rectangular in shape and fitted onto the upper edge of the said enclosure to complete the assembly of the small inline spinner box of the invention herein.

* * * * *